United States Patent [19]
Laws et al.

[11] Patent Number: 4,943,788
[45] Date of Patent: Jul. 24, 1990

[54] BROAD BAND VCO CONTROL SYSTEM FOR CLOCK RECOVERY

[75] Inventors: Peter G. Laws; Graham J. Fletcher, both of Wiltshire, United Kingdom

[73] Assignee: Plessey Overseas Limited, Ilford, United Kingdom

[21] Appl. No.: 329,719

[22] Filed: Mar. 28, 1989

[30] Foreign Application Priority Data

Mar. 28, 1988 [GB] United Kingdom ............... 8807320

[51] Int. Cl.⁵ .................... H03L 7/087; H03L 7/095
[52] U.S. Cl. ...................................... 331/11; 331/14; 331/25; 331/DIG. 2; 375/120
[58] Field of Search ................... 331/11, 12, 14, 25, 331/DIG. 2; 375/120

[56] References Cited

U.S. PATENT DOCUMENTS

| | | | |
|---|---|---|---|
| 4,069,462 | 1/1978 | Dunn | 331/11 |
| 4,191,976 | 3/1980 | Braun | 331/12 X |
| 4,365,211 | 12/1982 | Lee | 331/11 |
| 4,404,530 | 9/1983 | Stryer | 331/14 X |
| 4,787,097 | 11/1988 | Rizzo | 331/11 X |

*Primary Examiner*—Siegfried H. Grimm
*Attorney, Agent, or Firm*—Fleit, Jacobson, Cohn, Price, Holman & Stern

[57] ABSTRACT

A receiver circuit for data in NRZ1 coding transmitted at high data rates along optical fiber links, wherein in order to overcome problems of phase jitter in the incoming signal, a clock circuit is included comprising a phase locked loop with voltage controlled oscillator for generating a clock signal locked in phase to the incoming data signal, a phase detector for comparing the clock signal with the incoming data signal, a phase frequency detector for comparing the clock signal with a reference clock signal, a multiplexer for switching the phase locked loop to respond either to the output of the phase detector or the phase freqency detector, and a digital counting system for comparing the number of clock pulses generated in a reference period determined by the reference clock, the digital counting system controlling the multiplexer to switch to the output of the phase detector when it is determined that the clock signal is accurately following the reference clock signal.

10 Claims, 4 Drawing Sheets

BROAD BAND VCO CONTROL SYSTEM FOR CLOCK RECOVERY

This invention relates to a clock circuit including a controlled oscillator for use in providing a clock signal locked in phase to an incoming data signal.

Data signals are increasingly transmitted along fibre optic links. Such data signals normally have a well defined frequency, for example 125 Mbs$^{-1}$, but have a significant amount of phase jitter, caused by signal dispersion within the optical fibres, differential slew rates of the data edge transitions caused by diode switching, and noise in transimpedance amplifiers.

An international standard, FDDI, has been set requiring that data be transmitted at a set rate, typically 125 Mbs$^{-1}$ in 4B/5B format (a five bit code word representing four data bits) and in nonreturn to zero inverse (NRZ1) coding wherein in any bit period a positive or negative voltage transition indicates a '1' bit and the absence of a transition indicates a '0' bit. Thus transitions may occur at a maximum rate of once every bit period and at a minimum rate of once every ten bit periods (known as the master line state).

A major problem in the design of receiver circuits is that of phase jitter in the incoming data signal, requiring a local receiver clock having a well defined operating frequency together with a control circuit which accurately locks the oscillator to the incoming data signal and can rapidly adjust to phase deviations, and furthermore lends itself to integration.

Oscillators with a well defined operating frequency are commonly of the L-C type with components such as varicap diodes which cannot be formed on an integrated circuit.

The present invention provides a clock circuit for providing a clock signal locked in phase to an incoming data signal which includes transitions between upper and lower voltage levels, the clock circuit including a phase locked loop having a controlled oscillator providing said clock signal, a phase detector circuit responsive to said clock signal and to the incoming data signal for providing a first phase error signal, a reference clock source, means for comparing the reference clock signal with said clock signal to provide a second phase error signal, and selection means for selecting either the first or second phase error signal for control of the controlled oscillator.

Preferably said means for comparing comprises a phase frequency comparator which ensures a frequency lock prior to providing phase error information and said selection means is a multiplexer.

The controlled oscillator may be a voltage controlled oscillator (VCO) of any suitable type which relies upon a capacitive charging arrangement, for example a multivibrator, to define the oscillation frequency, in order that the oscillator be fabricated as an integrated circuit. With oscillators such as multivibrators it is a simple measure to adjust the frequency by adjusting the capacitive charging rate.

Since the incoming data signal will normally have a well defined frequency, the VCO is firstly set up locked in frequency to the reference clock by means of a phase frequency comparator, the frequency of the VCO thus being held within tightly defined limits. As preferred, a counter is provided which counts a predetermined number, for example 200, of cycles of the VCO over a predetermined period, say 40 cycles, of the reference clock. A tolerance of ±1 count is permitted to allow for a miscount due to edge jitter noise of the reference frequency source. When the frequency of the oscillator is determined to be locked to the reference clock, and the phase of the oscillator remains in phase with that of the reference clock, then the selection means selects the phase detector circuit in a second stage of operation, so that the first error signal provided by the phase detector circuit is applied to the VCO. Since a significant amount of phase jitter will normally be present, a similar method of checking phase lock may be employed by counting 200 cycles of the VCO over 40 cycles of the reference clock, but a larger count tolerance is permitted, say ±3 counts.

If the incoming data signal goes out of limits as checked by the counter, the data signal is assumed invalid and the clock circuit reverts to locking the VCO to the reference clock signal.

A preferred embodiment of the invention will now be described with reference to the accompanying drawings, wherein.

Figure 1:
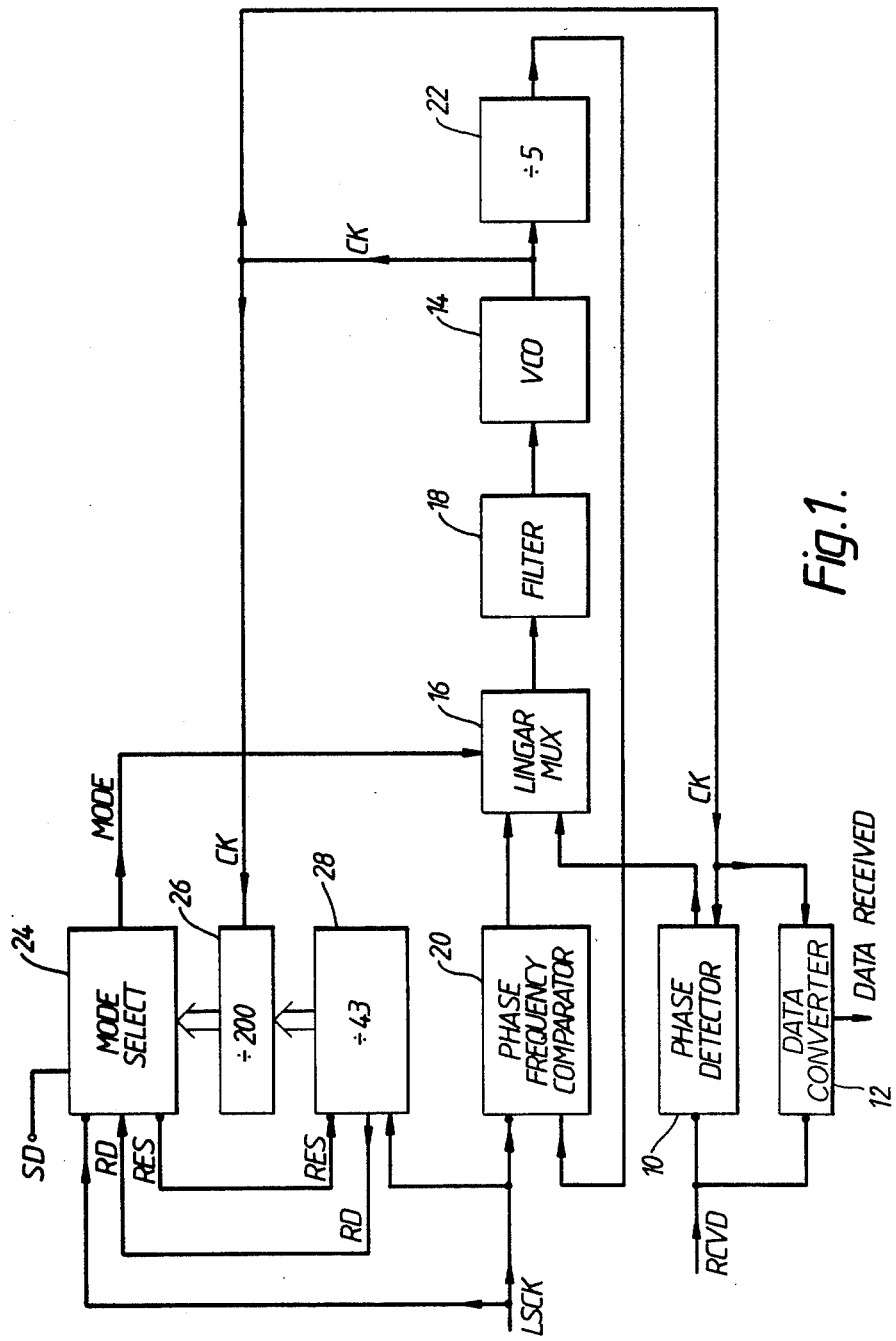
FIG. 1 is a block diagram of the preferred embodiment.

Referring now to FIG. 1, there is shown a receiver for receiving incoming data RCVD, being data transmitted across an optical fibre link at 125 Mbs$^{-1}$ in an NRZ1 code wherein a '1' bit is indicated by a voltage level transition (positive or negative) in a bit period and a '0' bit is indicated by the absence of a transition.

Data signal RCVD is applied to a phase detector 10 and to a data converter 12, which circuits also receive a local clock signal CK from a VCO 14. Detector 10 is operative to compare the phase of the incoming data with the phase of the clock signal in order to provide a phase error signal to VCO 14, via a linear multiplexer 16 and a charge pump and filter 18. Converter 12 gates the incoming data signal with clock CK in order to provide a Data Received signal in suitable form e.g. NRZ.

A reference clock signal LSCK of a frequency of e.g. 25 MHz, is applied to a phase frequency comparator 20 together with a version of clock signal CK divided down to the reference frequency by a divider ÷5 (more generally ÷N) 22. The phase error signal from comparator 20 is applied to VCO 14 via linear multiplexer 16. Linear multiplexer 16 is operative to select the inputs from detector 10 and comparator 20 under the control of mode select logic 24. Logic 24 operates under the control of eight bit counter 26 which counts 200 cycles of CK signal in a period determined by ÷43 counter 28 as 40 cycles of LSCK signal.

Figure 3:
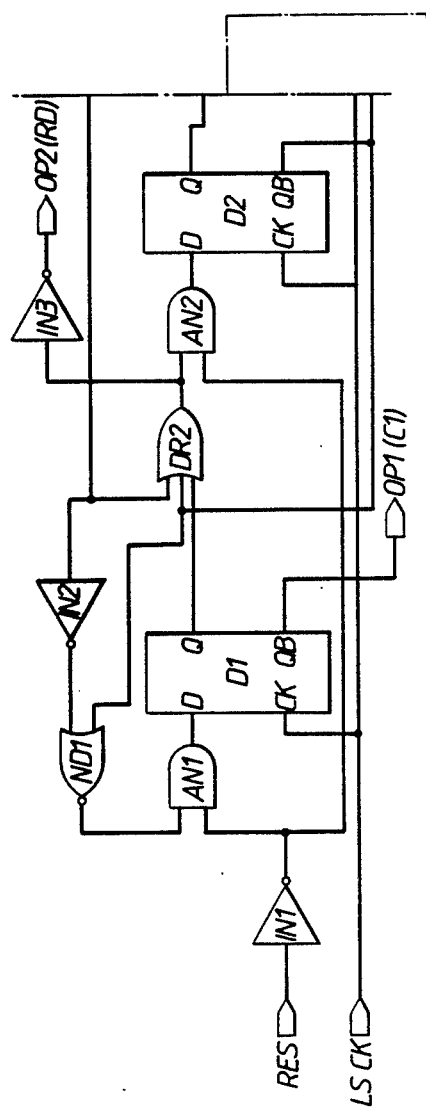
Figure 3:
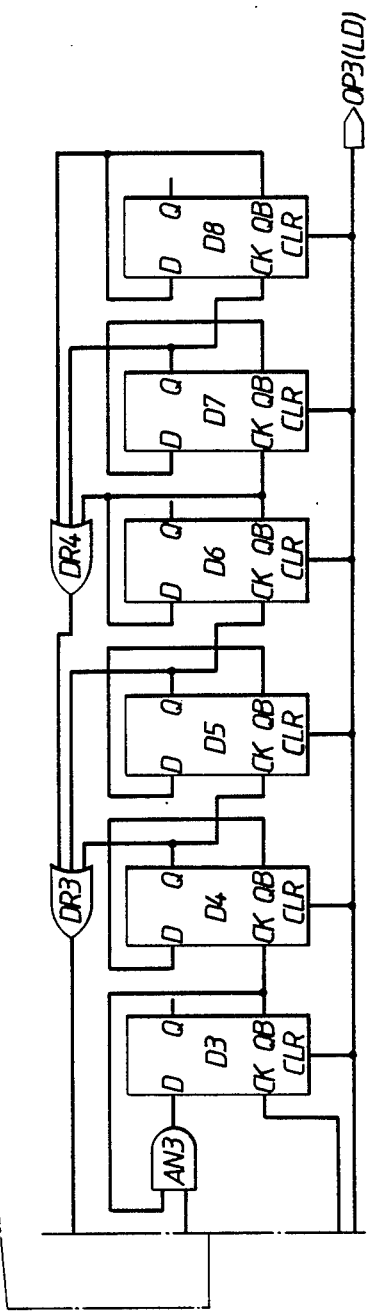

A detailed diagram of counter 28 is shown in FIG. 3, as comprising D-type flip flops D1 to D8. Signal LSCK is applied to the clock inputs of D1 to D3, and a reset input RES from logic 24 is applied to the D inputs of D1, D2 via AND gates AN1, AN2. OR gates OR1 to 4, NOR gate NO1 and AND gate AN3 complete the counter. The counter provides a ÷43 facility of the incoming LSCK signal (25 MHz) in two stages, firstly a ÷40 function which is signalled by output C1, which is provided to divider circuit 26, and secondly, within the three extra division steps, an output OP2 which provides a control signal to select logic 24 and an output OP3 which provides a reset signal both to the ÷43 counter and to counter 26.

Figure 2:
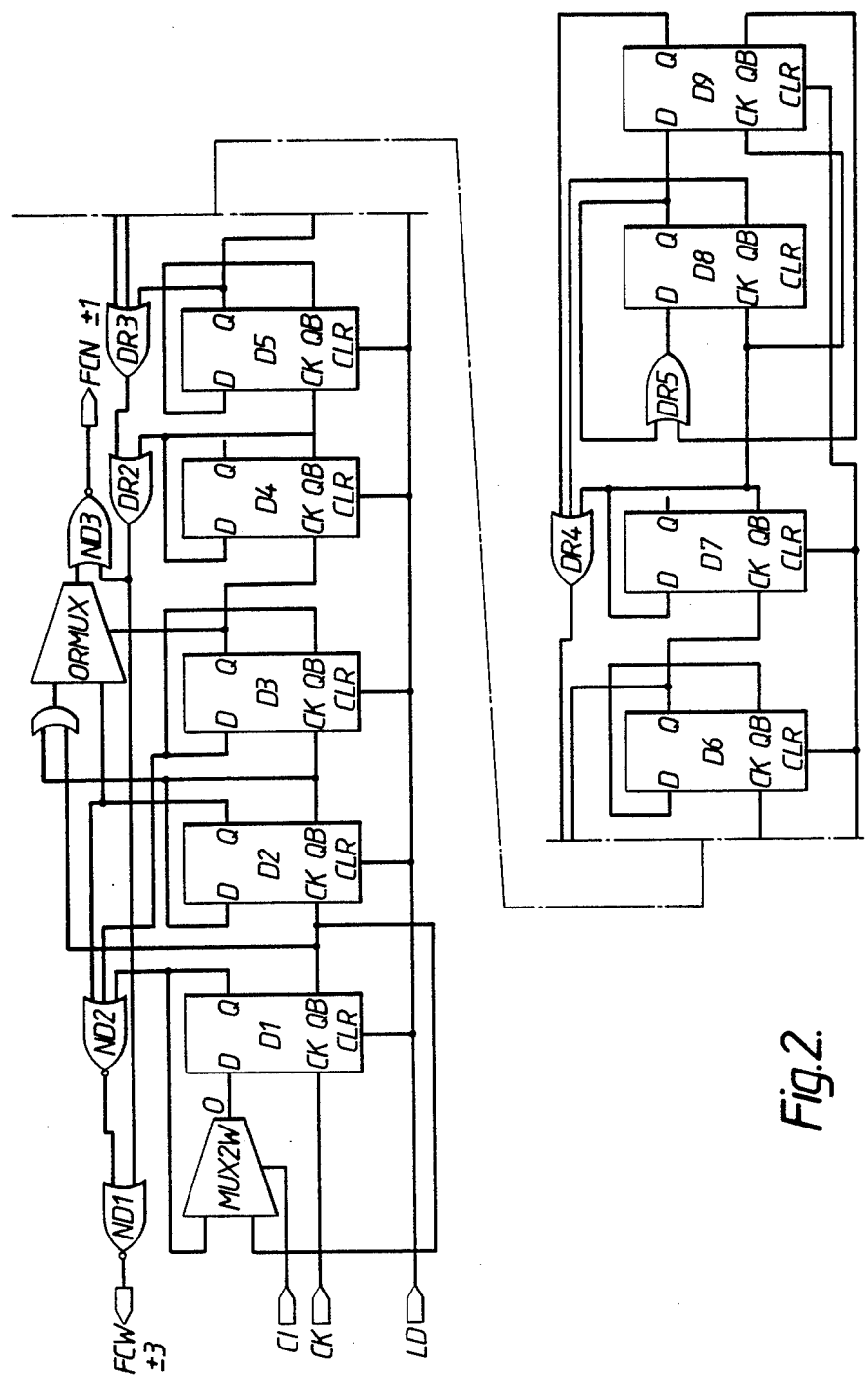
FIGS. 2, 3 and 4 are detailed block diagrams of counter circuits and mode select logic employed in FIG. 1.

A detailed diagram of counter 26 is shown in FIG. 2 as comprising a chain of D-type flip-flops D1 to D9, OR gates OR1 to 5, NOR gates NO1 to NO3 and two multiplexers MUX2W and ORMUX. Flip-flop D1 receives a clock signal CK from VCO 14. A reset signal LD is provided from OP3 of counter 28 and a C1 control signal is applied to MUX2W from OP1 of counter 28. Counter 26 provides outputs FCN and FCW to mode select logic 24. Output FCW indicates, when high, a nominal count of 200 which is within limits of ±3 whereas output FCN indicates, when high, a nominal count of 200 which is within limits of ±1.

Figure 4:
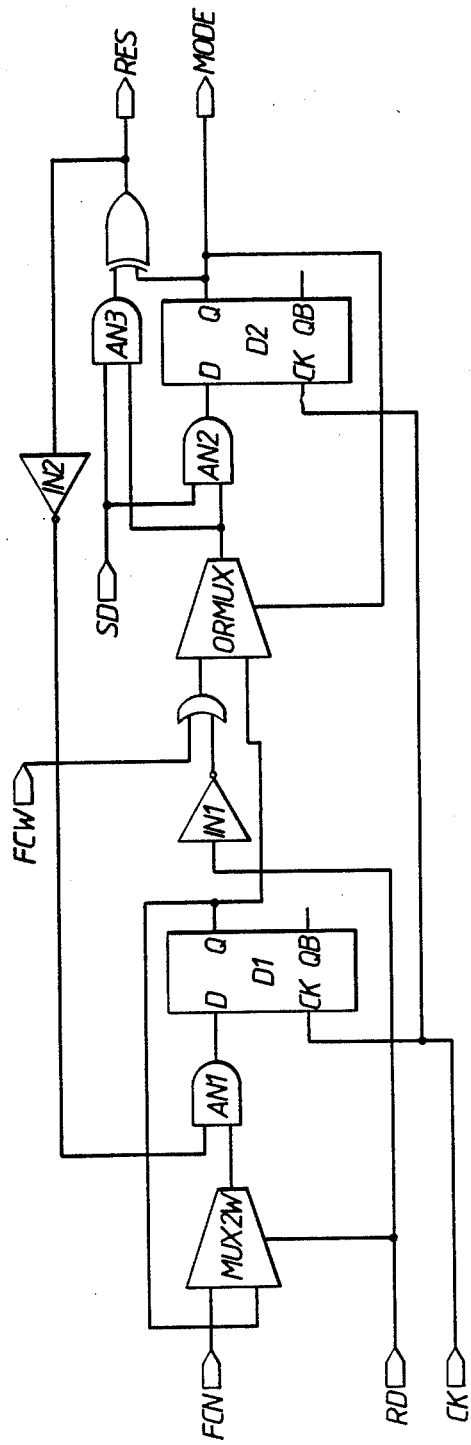

A detailed diagram of mode select logic 24 is shown in FIG. 4 as comprising two D-type flip-flops D1, D2, AND gates A1 to AN3 and multiplexers MUX2W and ORMUX. Clock signal LSCK clocks flip-flops D1 and D2. Input signal RD from output OP2 of counter 28 is operative to enable input FCN and input FCW from counter 26. When selected, either input FCN, FCW may provide a mode change whereby MODE output provides a signal to linear multiplexer 16 in order to change the mode of operation of the circuit. In addition a RES output is provided to circuit 28 in order to reset the counter.

A detailed description of the circuits of FIGS. 2, 3 and 4 will not be given, since their precise manner of operation will be apparent to one skilled in the art.

In operation, the circuit is initially set up with multiplexer 16 selecting the output from phase frequency comparator 20 for application to VCO 14. Thus in this mode of operation reference signal LSCK is compared with signal CK from VCO 14 (divided by N in circuit 22).

The output from comparator 20 represents the phase difference between signals CK and LSCK when the frequencies are identical. In order to check that the frequency of the VCO is correct, counter 26 is operative to count 200 cycles of CK. Thus when counter 28 is reset by signal RES, flip-flop D2 of counter 28 provides a high signal at OP3 which acts as signal LD to clear flip-flops D1 to D9 of counter 28. Thus at this time counter 26 commences to count cycles of CK while counter 28 counts cycles of signal LSCK. After 40 cycles of LSCK as determined by counter 28, counter 28 provides a signal OP1 as signal C1 to multiplexer MUX2W of counter 26 and a signal OP2 as signal RD to the multiplexers of mode select logic 24. These signals serve to enable outputs FCN and FCW of counter 26 and enable mode select logic 24 to respond to outputs FCN and FCW.

Thus at the end of 40 cycles of LSCK as determined by counter 28, counter 26 will count nominally 200 cycles of CK. Since VCO 14 is tracking signal LSCK, the count of counter 26 should be very close to 200. Since there may be some amount of edge jitter, a tolerance of ±1 is permitted in the count; if the count of counter 200 falls outside this tolerance band then signal FCW goes high, this signal causing mode select logic to provide RES signal to reset counter 28 in order that the counters restart.

Thus the circuit remains in this mode of operation until a count of 200 is achieved within the tolerance band of ±1 at which time mode select logic 24 will provide a MODE signal in order that multiplexer 16 select the phase error output signal from phase detector 10, so that VCO 14 tracks the clock rate of data signal RCVD. In this mode of operation data signal RCVD is received in a converter 12 which is clocked by signal CK. The clock rate of VCO 14 is again checked and at the end of 40 cycles of LSCK as determined by counter 28, the contents of counter 26 are assessed. If the output of FCW is high this indicates the count is outside the tolerance band of ±3 and the circuit is assumed to have lost synchronisation with data signal RCVD. In this case, signal FCW causes mode select logic 24 to change the mode of operation so that VCO is reinitialised to reference clock signal LSCK. If however signal FCW indicates that the tolerance band of ±3 has not been exceeded, then the circuits remains in the receive data condition in which VCO 14 is locked to the incoming data signal RCVD.

It will be understood that phase detector 10 may be of any suitable type. As preferred, the phase detector comprises integrate/hold circuits as disclosed in our copending U.S. application Ser. No. 07/329,718 filed Mar. 28, 1989 and entitled Clock Driven Data Sampling Circuit.

There has thus been shown and described a highly accurate circuit for determining with precision an incoming data signal. The circuit relies on VLSI techniques in that counters 36 and 38 have a large transistor count and it is only with VLSI techniques that such counters may be incorporated into an IC chip with the remainder of the detector circuit.

We claim:

1. A clock circuit for providing a clock signal locked in phase to an incoming data signal which includes transitions between upper and lower voltage levels, the clock circuit including a phase locked loop having a controlled oscillator providing said clock signal, a phase detector circuit responsive to said clock signal and to the incoming data signal for providing a first phase error signal, a reference clock source, means for comparing the reference clock signal with said clock signal to provide a second phase error signal, and selection means for selecting either the first or second phase error signal for control of the controlled oscillator wherein said selection means is controlled by mode selection means, and including first and second counters for counting predetermined numbers of cycles of the reference clock source and the controlled oscillator, respectively, the first counter providing a control signal upon reaching a predetermined count of the reference clock source to the second counter which thereupon stops counting, the second counter including control output means for providing signals indicating whether the count thereof is within predetermined tolerance bands, for control of the selection means.

2. A clock circuit as claimed in claim 1 wherein when the circuit is in a mode in which the controlled oscillator responds to said first error signal, said control output means provides a signal indicating whether the count of the second counter is within a first predetermined tolerance band, and if so, said selection means is operable to select the second phase error signal.

3. A clock circuit as claimed in claim 2 wherein when the circuit is in the mode in which the second phase error signal is selected, said control output means provides a signal indicating whether the count of the second counter is within a second predetermined tolerance band, and if not, said selection means is operable to select the first phase error signal.

4. In a data receiver circuit for receiving a data signal which includes transitions between upper and lower voltage levels, a clock circuit for providing a clock signal locked in phase to the data signal, the clock circuit comprising:

a phase locked loop having a voltage controlled oscillator providing said clock signal;

a first phase detection means responsive to said clock signal and to the incoming data signal for providing a first phase error signal;

a reference clock source providing a reference clock signal, a second phase detection means for comparing the reference clock signal with said clock signal for providing a second phase error signal;

selection means for selecting either the first or second phase error signal for control of the voltage controlled oscillator;

and a digital counting system for control of the selection means, the digital counting system comprising a reference period means responsive to the reference clock signal for defining a reference period;

a counting means for counting the number of pulses of said clock signal occurring during said reference period, the counting means including output means for providing output signals in dependence on whether said number of pulses fall within predetermined limits;

said selection means being coupled to receive the output signals of said counting means for controlling the operation of the selection means for permitting control of the voltage controlled oscillator by the first phase error signal or the second phase error signal.

5. A circuit according to claim 4, wherein said reference period means comprises a counter for counting a predetermined number of pulses of said reference clock signal, the counter including output means for providing a control signal (C1) to the counting means when said predetermined number have been counted.

6. A circuit according to claim 5, wherein said counter is operative in a first phase in which said predetermined number is counted and a second phase in which said output means provides reset signals to said counter and to said counting means.

7. A circuit according to claim 4 wherein said counting means comprises a counter including first output means providing a first output signal and a second output means providing a second output signal, the first output signal indicating whether the number counted is within first predetermined limits to a nominal count, and the second output signal indicating whether the number counted is within second predetermined limits to a nominal count, said second predetermined limits being narrower than said first predetermined limits.

8. A circuit according to claim 7 wherein said first and second output means are coupled to said selection means, whereby said selection means is operative to select said first phase error signal or said second error signal in dependence on the values of said first and second output signals.

9. A circuit according to claim 4 wherein said first phase detection means comprises a phase detector and said second phase detection means comprises a phase frequency comparator.

10. A circuit according to claim 4 wherein said selection means includes a multiplexer having inputs for receiving the first and second phase error signals and having an output for providing one of the first and second phase error signals to the voltage controled oscillator;

and said selection means including mode selection means having input means for receiving said output signals of said counting means and having output means for providing a control signal to control said multiplexer output.

* * * * *